United States Patent [19]

Lillkvist

[11] 4,072,359
[45] Feb. 7, 1978

[54] DEVICE FOR MANEUVERING THE DISCHARGE TUBE OF A HARVESTING MACHINE

[75] Inventor: Salomo Lillkvist, Alholmsgatan, Finland

[73] Assignee: A/S GYRO, Skive, Denmark

[21] Appl. No.: 742,428

[22] Filed: Nov. 17, 1976

[30] Foreign Application Priority Data

Nov. 21, 1975 Finland .................................. 753291

[51] Int. Cl.² ............................................. B65G 53/40
[52] U.S. Cl. ......................................... 302/34; 302/61
[58] Field of Search ........................ 302/10, 34, 37, 38, 302/60, 61; 198/640, 641, 642; 37/43 R; 56/13.3, 13.4; 74/501 R, 501 M, 501 P

[56] References Cited

U.S. PATENT DOCUMENTS

| 3,245,283 | 4/1966 | Van Noord | 74/501 M |
| 3,265,444 | 8/1966 | Waldrop | 302/61 |
| 3,510,171 | 5/1970 | Bacon | 302/61 |
| 3,527,528 | 9/1970 | McKee et al. | 74/501 M |
| 3,985,394 | 10/1976 | Rolfes | 302/34 |

Primary Examiner—Johnny D. Cherry
Assistant Examiner—Jeffrey V. Nase
Attorney, Agent, or Firm—Watson, Cole, Grindle & Watson

[57] ABSTRACT

Device for maneuvering a discharge tube of a tractor-drawn agricultural harvesting machine, e.g. a field ensilage harvester or chopper, wherein the discharge tube comprises a lower duct portion secured to the housing of the harvester and a discharge duct portion rotatably connected to the lower duct portion and, preferably, a scoop-formed discharge flap pivotally connected at the outlet end of the discharge duct portion, the device, moreover, comprising operating means for applying rotation to the discharge duct portion with respect to the lower duct portion, said operating means being reachable from the driver's seat and wherein a bracket which pivotally supports a transversely extending lever is secured to the lower duct portion, the free ends of the lever being pivotally secured to rigid connecting links the other ends of which are pivotally connected to ears secured at diametrically opposite sides of the discharge duct portion, said operating means being connected to said lever so as to apply a moment of the lever.

4 Claims, 2 Drawing Figures

DEVICE FOR MANEUVERING THE DISCHARGE TUBE OF A HARVESTING MACHINE

BACKGROUND OF THE INVENTION

The present invention relates to a device for maneuvering a discharge tube of a tractor-drawn agricultural harvesting machine, e.g. a field ensilage harvester or chopper of the kind wherein the discharge tube comprises a lower duct portion secured to the housing of the harvester and a discharge duct portion rotatably connected to the lower duct portion and, preferably, a scoop-formed discharge flap pivotally connected at the outlet end of the discharge duct portion and wherein the device, moreover, comprises operating means for applying rotation to the discharge duct portion with respect to the lower duct portion, wherein the operating means are reachable from the driver's seat.

In particular, in connection with field ensilage harvesters or field choppers, but also in connection with other corresponding agricultural machines wherein beet tops, grass or other crops chopped by means of a rotating chopper drum or the like cutting device, via a discharge tube are to be transported to a wagon, such transport has proved to cause difficulties. Usually, the wagon is provided with high side walls and, accordingly, the discharge tube must extend up over the side walls in order to discharge the crops into the wagon. Moreover, the crops must be evenly distributed in the wagon. These requirements have made it necessary to divide the discharge tube into a lower duct portion and an upper discharge duct portion which is rotatably connected to the lower duct portion and to arrange a scoop or flap pivotally about an axis extending generally perpendicular to the axis of the discharge tube at the end of the upper discharge duct portion in order to direct the crops towards different areas of the wagon. The connection usually provided between the upper and lower duct portions causes a relatively high friction and the tube portions often jam in such a way that rotation of the upper duct portion is prevented. The diameter of the duct portions at the joint is rather great and, accordingly, a rather great force is necessary in order to be able to rotate the upper duct portion. Experiments have been done by securing ears at opposite sides of the upper duct portion and by securing a cable to each of these ears in order to rotate the upper duct portion by applying pulling forces to the ears by means of the cables. However, due to the fact that the cables, used in this way, will apply pulling forces only at one side of the joint, considerable shearing forces are caused which result in increasing friction and, accordingly, it is difficult to rotate the upper duct portion.

Different maneuvering devices have been proposed which are usable when the tractor, by means of which the harvester is transported, is not provided with a cabin for the driver. However, nowadays it is common to provide the tractor with a completely closed cabin in order to protect the driver under different climatic conditions. The maneuvering of the discharge tube should be carried out inside such completely closed cabin in an appropriate and easy way.

SUMMARY OF THE INVENTION

It is the aim of the present invention to provide such device. According to the present invention the maneuvering device comprises a bracket which pivotally supports a transversely extending lever and is secured to the lower duct portion, rigid connecting links are pivotally connected to the free ends of the lever and the other ends of the connecting links are pivotally connected to ears secured at diametrically opposite sides of the discharge duct portion and, moreover, the operating means are connected to the lever, so as to apply a moment to the lever. By means of this construction it is achieved that the discharge duct portion is rotated by means of oppositely directed forces applied to opposite sides of the discharge duct portion by means of the rigid links and, accordingly, shearing forces are avoided, because a moment or force couple is applied to the discharge duct portion, the centre of which is positioned at the centre of the swivel joint between the upper and lower duct portions.

DESCRIPTION OF THE PREFERRED EMBODIMENTS

Figure 1:
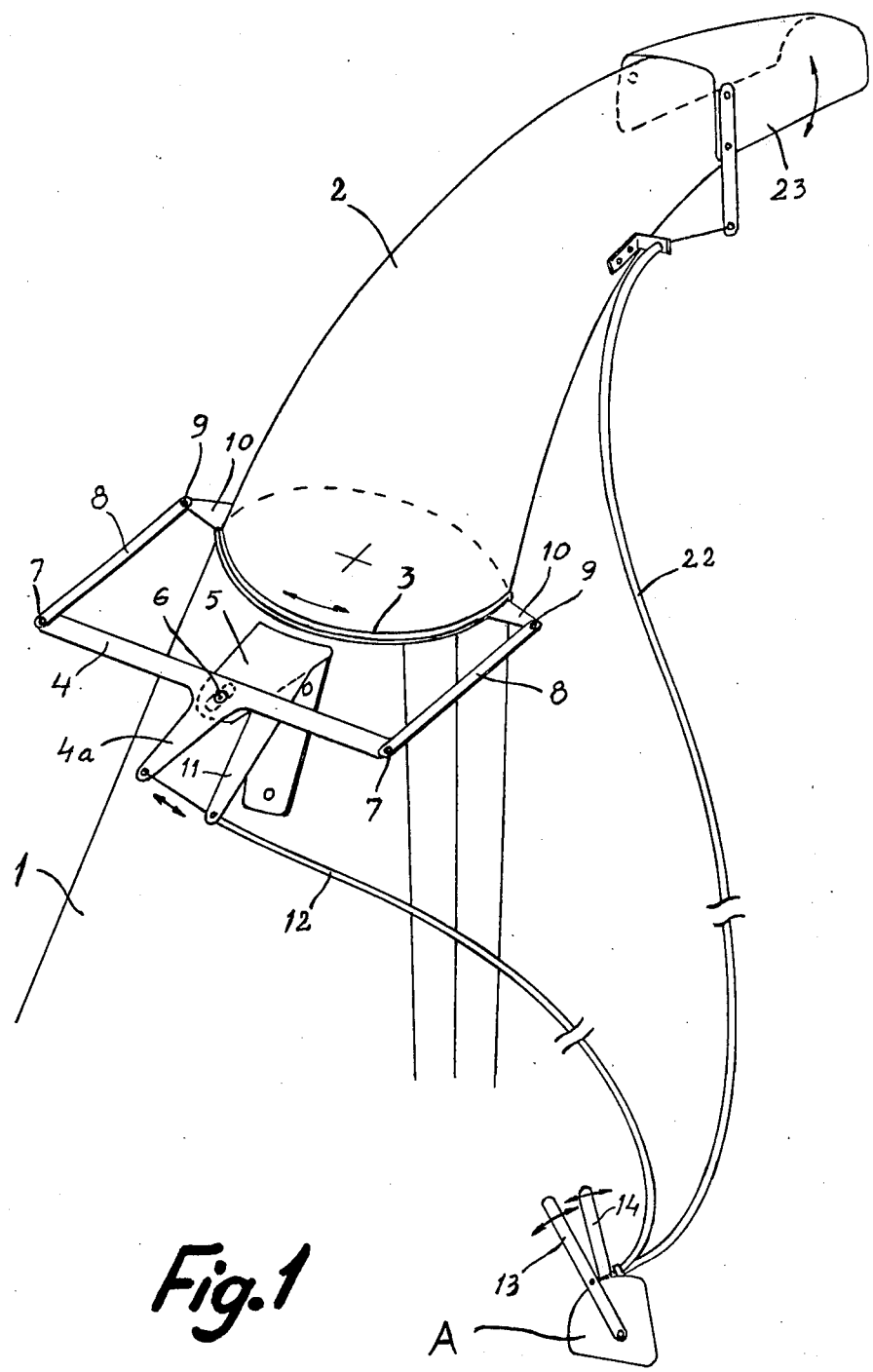
FIGS. 1 and 2 show schematically two embodiments of a device for maneuvering a discharge tube of a tractor-drawn agricultural harvesting machine according to the invention.

Referring to the drawings, 1 denotes a lower duct portion and 2 denotes an upper discharge duct portion of a discharge tube for a tractor-drawn field ensilage harvester of a kind known per se and, accordingly, not further illustrated. However, it should be mentioned that the harvester in question comprises a chopper drum rotatable about a horizontal axis and arranged in a housing to which the lower duct portion 1 is secured so as to merge into the interior of the housing. The upper discharge duct portion is rotatably connected to the lower duct portion by means of a swivel joint 3. Approximately, at the level of the joint 3 a transversely extending lever 4 is by means of a pivot pin 6 rotatably connected to an angle-formed mount or bracket 5 which is secured to the lower discharge duct portion 1. Advantageously, the hole in the lever 4 for the pivot pin 6 is oblong in the longitudinal direction of an arm 4a projecting from the lever 4. At the ends of the transversely extending lever 4 rigid links or arms 8 are rotatably connected by means of pivot pins 7. The other ends of the arms or links 8 are pivotally connected to pins 9 secured to the outer ends of ears 10 secured to the upper duct portion 2. The distance between the pins 7 and 9 is the same at both sides of the duct and the ears 10 are arranged diametrically with respect to the center of the joint 3.

The arm 4a extends approximately from the centre of the lever 4 in the embodiment according to FIG. 1. From the bracket 5 a projection 11 extends and at the end of the projection 11 the outer flexible sleeve of a Bowden-cable 12 is secured. The cable of the Bowden-cable extending in the flexible tubular sleeve is secured to the arm 4a. A support device A for the handle 13 of the Bowden-cable 12 may easily be introduced into the driver's cabin of a tractor, e.g. through a small opening in a window or the like in the cabin. A further handle 14 of the support device A may via a further Bowden-cable 22 operate an upper scoop-formed portion or flap 23 which is pivotally connected with the upper end of the discharge duct portion about a horizontal axis. By using a Bowden-cable 22 no return spring is necessary in order to return the scoop-formed flap 23 to its neutral position.

The support device A may in an appropriate way (easily removable) be secured within the reach of the driver of the tractor sitting on his seat in the cabin of the tractor. The support device is very slim and may, accordingly, easily be inserted through a gap, e.g. a window, which is not completely closed or in any othr way. Due to the fact that the laterally extending lever 4, when being acted upon by the cable 12, both pulls and pushes by means of the rigid arms or connecting links 8 no overdue stresses and, accordingly, no overdue friction is caused between the movable upper discharge duct portion 2 and the lower duct portion 1 secured to the housing of the machine. In other words, the upper discharge duct portion 2 has been provided with a theoretical fulcrum which is positioned at the centre of the ducts as indicated on the drawing by means of a cross.

Figure 2:
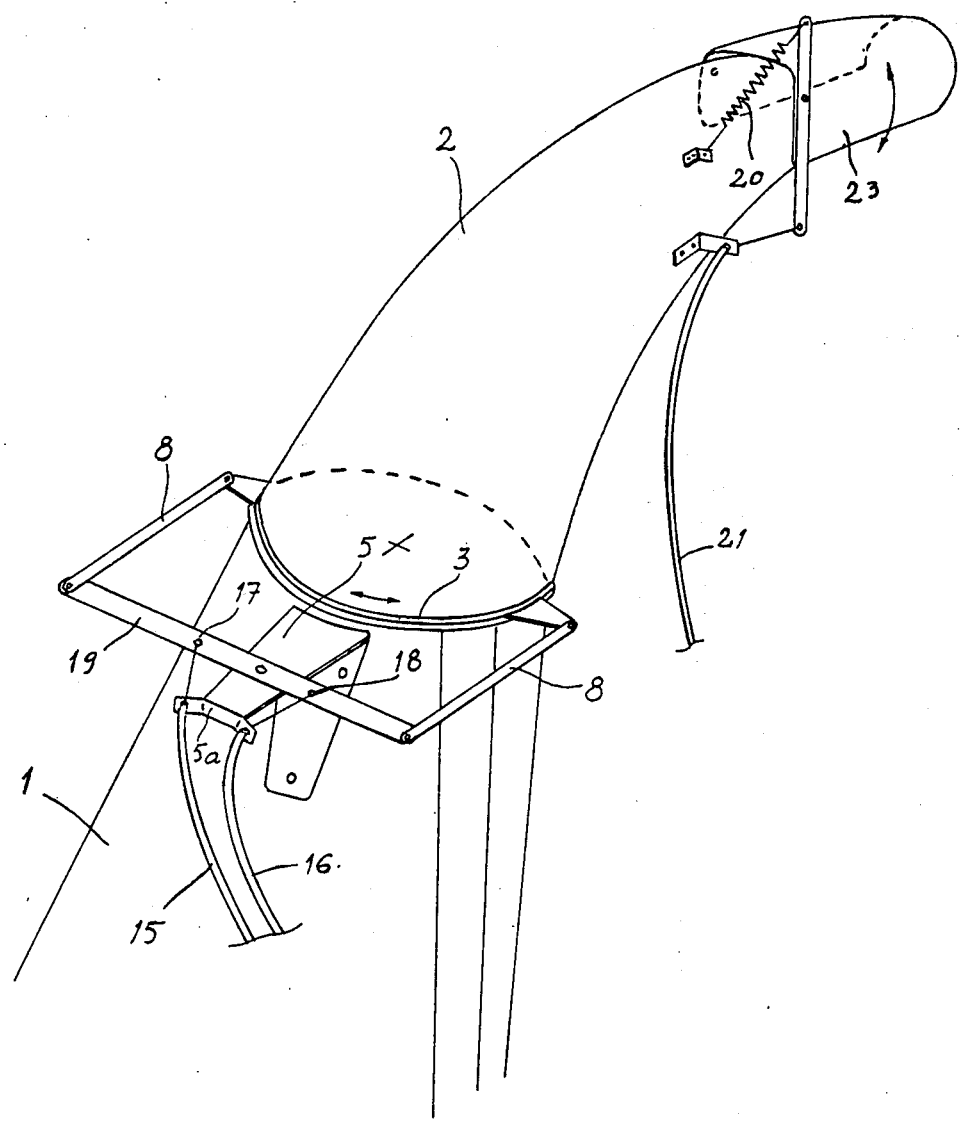

In the embodiment of the device illustrated in FIG. 2 two different Bowden-cables 15 and 16 are used for maneuvering the upper duct portion 2. The bracket 5 is provided with an extension 5a to which projections are secured to which the outer sleeves of the Bowden-cables 15 and 16 are secured. The ends of the cables of the two Bowden-cables 15 and 16 are secured to the transversely extending lever 19 at opposite points 17 and 18, respectively, of the fulcrum of the lever 19. By maneuvering the upper duct portion 2, one or the other of the cables of the Bowden-cables applies a pulling force at one of the securing points 17 or 18 on the transversely extending lever 19. The upper duct portion 2 is rotated in the same way as in the embodiment in FIG. 1, viz. by means of rigid arms or links 8. The upper scoop-formed portion 23 may be maneuvered by means of a corresponding cable 21. However, according to the embodiment in FIG. 2 the scoop-formed portion is provided with a return spring 20. Also in the embodiment illustrated in FIG. 2 both pushing and pulling forces will be transferred to the upper duct portion 2 via the links 8 and, accordingly, a moment about the fulcrum of the duct portion 2, marked by means of a cross in FIG. 2, will be provided.

It will be understood that the maneuvering of the transversely extending lever 4 or 19 and the arms or links 8 connected thereto and, accordingly, also of the upper duct portion 2 may be carried out in several different ways. It has been proved that the two handles 13 and 14 will be kept in the positions to which they are moved without the need of any locking means and, accordingly, the whole device is very simple and easy to maintain. The shearing forces which previously made the maneuvering of the duct portion 2 difficult are eliminated by means of the construction according to the invention and no portions will jam by the rotation of the duct portion 2 with respect to the duct portion 1.

I claim:

1. Maneuverable discharge tube means comprising a lower duct portion, a discharge duct portion rotatably mounted on said lower duct portion, and means for rotatably maneuvering said discharge duct portion relative to said lower duct portion, said maneuvering means comprising:

a pair of ears secured to said discharge duct portion at respective opposite sides of the latter;

a bracket secured to said lower duct portion;

an elongated lever pivotally mounted on said bracket at a point on the lever intermediate the ends thereof;

a pair of elongated, rigid links, one of said links having one of its ends pivotally connected to one end of the lever and having its other end pivotally connected to one of said ears, the other of said links having one of its ends pivotally connected to the other end of the lever and having its other end pivotally connected to the other of said ears; and means for rotating said lever relative to said bracket.

2. The invention of claim 1, wherein said rotating means comprises Bowden-cable means connected to said lever.

3. The invention of claim 1, wherein is included means mounting said lever on said bracket, said means comprising a pivot pin on said bracket and means defining an opening in said lever at said point, said opening being elongated in a direction transverse to the elongation of said lever, said pin extending through said opening.

4. The invention of claim 1, wherein said rotating means comprises a pair of cables secured to said lever at respective opposite sides of said point.

* * * * *